United States Patent [19]

Katz

[11] Patent Number: 5,012,453
[45] Date of Patent: Apr. 30, 1991

[54] INVERSE VERTICAL SEISMIC PROFILING WHILE DRILLING

[76] Inventor: Lewis J. Katz, 3521 Westwood Dr., Salt Lake City, Utah 84109

[21] Appl. No.: 516,115

[22] Filed: Apr. 27, 1990

[51] Int. Cl.$^5$ .............................................. G01V 1/36
[52] U.S. Cl. ....................................... 367/57; 367/38; 367/40; 364/421
[58] Field of Search ..................... 367/39, 40, 41, 42, 367/57, 38, 23; 364/421

[56] References Cited

U.S. PATENT DOCUMENTS

| | | | |
|---|---|---|---|
| 3,530,430 | 9/1970 | Embree | 367/40 |
| 3,812,457 | 5/1974 | Weller | 367/40 |
| 4,718,048 | 1/1988 | Staron et al. | 367/40 |
| 4,802,146 | 1/1989 | Moeckel | 367/52 |
| 4,849,945 | 7/1989 | Widrow | 367/30 |
| 4,873,675 | 10/1989 | Barr, Jr. et al. | 367/57 |
| 4,894,809 | 1/1990 | Moeckel | 367/57 |
| 4,922,362 | 5/1990 | Miller et al. | 367/57 |

Primary Examiner—Ian J. Lobo
Attorney, Agent, or Firm—Trask, Britt & Rossa

[57] ABSTRACT

A method for producing an inverse vertical seismic profile using a seismic source place down a borehole has been invented. The directly transmitted waves from the seismic source and the secondary reflectances thereof are detected by a sensor(s) on the earth's surface. The method depends only on knowing the relative arrival times at the sensor of the direct waves and the secondary reflectance waves. A pseudo-reflection seismogram is produced by (1) Autocorrelating a recording of a long series of random pulses, such as those produced by a drill bit, to produce a one-sided autocorrelation function containing peaks corresponding to the direct waves, primary and secondary reflectances; (2) Stacking (adding the amplitudes for equivalent time points) a plurality of autocorrelation functions obtained at a single depth in the borehole to reduce noise; (3) Producing a series of stacked one-sided autocorrelation functions for different depths in the borehole to yield an IVSP; and (4) Vertically stacking together the one-sided autocorrelation functions from the series of recordings to remove peaks due to primary reflectances. The invented method also provides means to derive the interval velocities for individual geologic strata and to determine the position of the source relative to the IVSP and to a geologic horizon. The IVSP, source positions, and interval velocities can be determined at the well site in approximately real time. A single, one-component seismic sensor is sufficient for the recordings required to produce the IVSP. Either polycrystalline diamond bits or tricone bits may be used as seismic sources. However, the method is not limited to continuous randomly generated seismic sources and may also be used with periodic or impulsive sources.

26 Claims, 6 Drawing Sheets

INVERSE VERTICAL SEISMIC PROFILING WHILE DRILLING

BACKGROUND OF THE INVENTION

Field: This invention relates generally to vertical seismic profiles (VSP), which are used to obtain information needed to perform more precise interpretations of geophysical seismic data and to obtain geophysical information beyond the limits of the well bore. More specifically, a method of constructing an inverse vertical seismic profile is disclosed.

State of the Art: One current method for performing a VSP survey involves clamping a set of three component geophones to the walls of the borehole for coupling. A repeatable surface source such as an explosive detonation is used to produce a seismic signal. The seismic wave transmitted directly to the geophones and the waves reflected from geologic horizons located below the geophones (referred to hereafter as "primary reflectances" or "primary reflected waves") are recorded on the downhole geophones. The downhole geophones are then moved to a new depth location in the well and the recording sequence is repeated. This is a long and tedious process. Many problems can occur with coupling and determining the orientation of the three component geophones.

A more efficient method of obtaining similar data is to place the seismic source in the borehole and the geophones on the surface. The profile compiled in this way is referred to as an inverse vertical seismic profile (abbr. hereinafter as IVSP)

However, measurements made by the above methods can only be performed when drilling is not taking place. It is highly desirable to be able to perform the VSP recording(s) during drilling and process the data on-site, so that the drilling engineer can make use of the information. For example, when the drill bit is about to reach a boundary between different geological strata, the drilling engineer may wish to interrupt drilling or modify the drilling conditions before penetrating into the next stratum. Also, there often may be inaccuracies in the mapping of the strata. The drilling engineer may then be unable to determine whether he has penetrated the correct stratum and has a "dry hole," or whether a deeper hole is required to penetrate the desired stratum.

Methods have been developed which can be used during drilling. These methods employ the seismic signal provided by the motion of a rotary drill bit in the borehole, or by a seismic generator attached to the drill string near the bit. Such methods are disclosed in U.S. Pat. Nos. 4,718,048 to Staron et al., 4,849,945 and 4,365,322 to Widrow, 4,207,619 and 2,933,144 to Scott, the contents of which are incorporated by reference. All of these teachings utilize sensors on the earth's surface to record the directly transmitted waves and the primary reflectances thereof which bounce to the sensors from geologic horizons below the source. Consequently, each recording must be made with the source (i.e. the drill bit) located within the limits of a single location. The length of recording time is limited to relocations of the bit during drilling of 10-15 feet at most. Thus, recording time is typically less than 20-30 minutes. The resolution of IVSPs compiled by these methods is substantially limited both by the short recording times and the relocation of the drill bit down the borehole as drilling commences.

In the Staron teaching, the drill bit's signal is recorded both at the top of the drill string and on the surface of the ground. The data recorded at the top of the drill string is used as a pilot signal that represents the source signature. It is cross correlated with the seismic signals that pass through the earth and are recorded on the surface geophones. A system believed to be similar to that of Staron is in current industrial use under the tradename TOMEX (Western Atlas Downhole Seismic Services, Rector et al., Oil & Gas Journal, pp. 55-58, June 19, 1989).

The Staron method is furthermore severely limited in many drilling situations by the ability to decipher the signal recorded at the top of the drill string. The quality of the pilot signal is adversely affected by (1) internal damping in the drill stem and the losses in the mud that attenuate the amplitude of the vibrations emitted from the drill bit; (2) resonances in the drill stem, bottomhole assembly, and derrick that deform the recorded signals, and (3) the presence of parasitic signals caused by the drill pipe hitting the sides of the borehole or by surface vibrations from other machinery (Lutz et al. 1972, Transactions Soc. Petrol. Engin. vol. 253, the contents of which are hereby incorporated by reference). Because of these problems, it is difficult to use the Staron method in highly deviated wells. Also, to date the Staron method is useful only with tricone bits, whose vertical motions permit the pilot signal to be recorded at the top of the drill string. Polycrystalline diamond bits (referred to hereinafter as "PDC" bits) cannot be used with the Staron technique, because PDC bits impact the borehole horizontally (Brett et al. 1989, Soc. of Petrol. Eng., SPE 15971, the contents of which are hereby incorporated by reference). Moreover, the Staron method produces unsatisfactory results when downhole drilling motors are employed.

The compilation of a VSP or IVSP from the detected direct and reflected waves requires considerable processing of the recorded signals. A typical method used to process a recording of a plurality of randomly produced seismic signals is a pulse coding technique called Sosie (Barbier, 1982, Pulse coding in seismology, publ. Intl. Human Resource Devel. Corp., Boston, the contents of which are hereby incorporated by reference). The continuous sequence of pulses or vibrations that are produced by a drill bit are transmitted into the earth and are effectively being convolved with the earth's reflectivity response. The Sosie technique compresses a continuous sequence of pulses into a single pulse. This method is similar to echo compression techniques used in radar and sonar detection. In the Sosie technique, the onset times of the source pulses are recorded. The observed seismogram S, containing the source pulses W and the reflectance response R of the earth, is crosscorrelated with the onset of the source (in the method of Staron, the signal which is simultaneously recorded at the top of the drill string). The crosscorrelation of the two like functions produces the autocorrelation function ACF. In the Sosie method the autocorrelation of the source signature is produced:

$$S(t) = ACF\ W(t) * R(t) \qquad (1)$$

Using a long random sequence of pulses such as those provided by drill bit motion, the source autocorrelation function reduces to an individual pulse I and correlation noise.

$$S(t) = I(t) * R(t) + noise \qquad (2)$$

This cross-correlation procedure is known as decoding. The seismogram from the continuous pulses is now similar to that produced from a single shot pulse (i.e., dynamite) and the earth's reflectivity function.

It is the object of this invention to overcome the limitations of previous methods. More specifically, it is an object of the invention to provide a method of seismic sensing while drilling which is not affected by relocation of the source in the borehole, permitting recording times of extended duration without loss of resolution.

It is another object of the invention to provide a method which can be used with any type of downhole seismic source and with any type of drill bit.

It is a further object of the invention to provide such a method which does not require prior knowledge of the source signature, such as is obtained by recording a signal from the top of the drill string.

It is moreover an object of the invention to provide a method of recording and processing overlapping seismic signals produced from a plurality of seismic sources placed within a borehole.

It is a further object of this invention to provide such a method permitting the interval velocities for different geological strata to be determined.

Finally, it is an object of the invention to provide means for locating the position of the source relative to the IVSP and determining when the source is about to penetrate the boundary of a geologic stratum in approximately real time.

SUMMARY OF THE INVENTION

A method and apparatus for inverse vertical seismic profiling using a seismic source placed down a borehole have been invented. One or more sensor(s) on the earth's surface are used to detect the transmitted signals from the seismic source, including the direct waves and the primary and secondary reflectances thereof. The term "primary reflectances" refers to portions of the original seismic signal which undergo a single reflection at a geologic horizon before being detected by the surface sensor(s), while "secondary reflectances" are portions of the seismic signal which undergo at least two reflections before detection at the surface. The recording of the transmitted signals is subjected to autocorrelation to enhance detection of the secondary reflectances and to produce the autocorrelogram of the earth's transmissivity response. The method depends only on knowing the times of arrival at the sensor of the direct waves and the primary and secondary reflectances.

According to the invented method, a pseudo-reflection seismogram may be produced by the following steps: 1. Autocorrelating a recording of a long series of random pulses, such as those produced by a drill bit, to produce a one-sided autocorrelation function containing peaks corresponding to the arrival times of the direct waves and the primary and secondary reflectances. 2. Producing a series of one-sided autocorrelation functions from recordings made at different depths in the borehole, which series comprises an IVSP. 3. Vertically stacking together (adding the amplitudes for equivalent time points) the one-sided autocorrelation functions from the series of recordings to remove peaks due to primary reflectances. The pseudo-reflection seismogram thus obtained is equivalent to a reflection seismogram made using a source and sensor both located on the earth's surface.

The invented method also provides means to derive the interval velocities for individual geologic strata and to determine the position of the source relative to the IVSP and to a geologic horizon. This is accomplished using the stacked one-sided autocorrelation functions for the different individual source positions. Either the interval velocity or the source position can be calculated from the shifts in position of the peaks corresponding to the arrival times of the primary reflectances, relative to the arrival times of the direct wave (defined as t=0) and the secondary reflectance(s).

A single, one-component seismic sensor is sufficient for the recordings required to produce the IVSP. Since drill bit or other types of seismic sources are likely to produce both compressional (P) waves and shear (S) waves, a multi-component sensor having both vertical motion sensitive and horizontal motion sensitive components may be preferred. The method is not limited to continuous randomly generated seismic sources, but may also be used with impulsive sources, such as explosive detonations, airgun, and hammer. Alternate processing sequences for producing the autocorrelation function are also disclosed, involving Fourier transformation of the recorded power spectra. In step 3 above, the primary reflectance waves can be removed by using velocity or dip filters rather than by stacking the autocorrelation functions.

The present invention overcomes the limitations of the prior art. Because the arrival time of a given secondary reflectance relative to the direct wave is constant no matter what the source depth, the recording time is not limited by relocation of the seismic source in the borehole. Because the actual onset time of the source signal is not needed, the invented method and apparatus do not require that a seismic sensor be attached to the top of the drill string. Furthermore, the downhole source is not limited to a tricone bit.

DETAILED DESCRIPTION OF INVENTION

Figure 1:
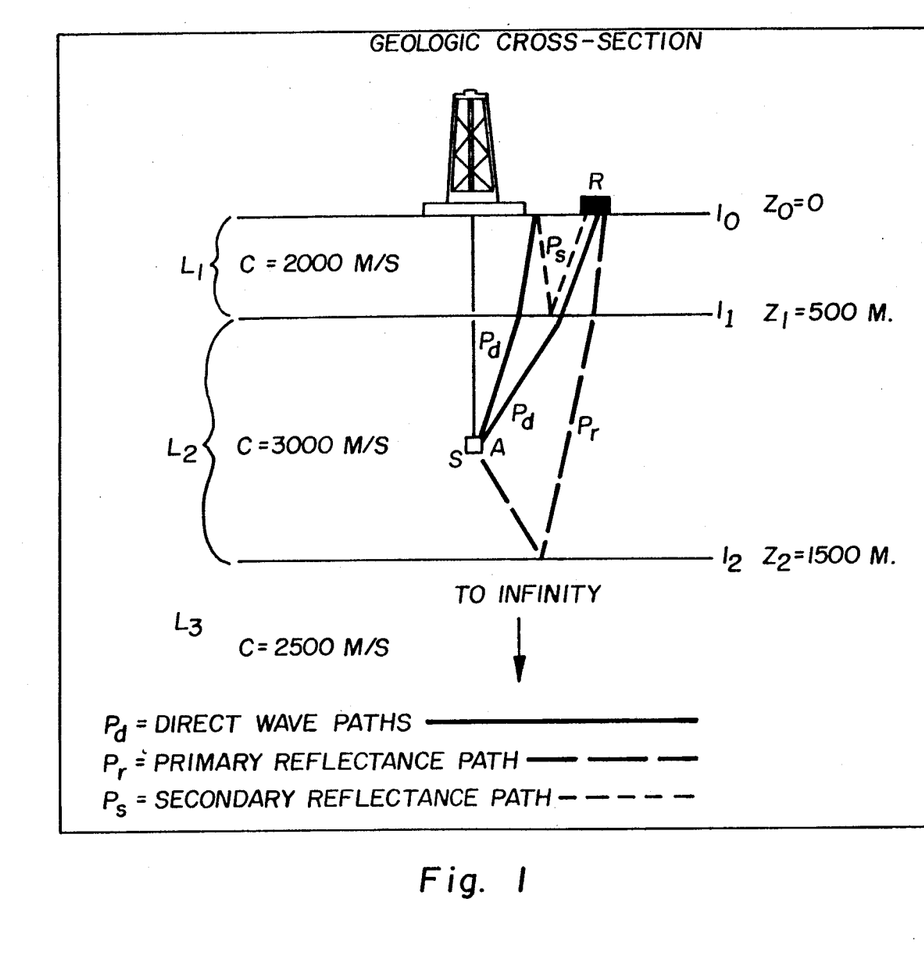
FIG. 1 illustrates a borehole being drilled into a sequence of geological layers and the travel paths of the transmitted signal produced by a drill bit including the primary and secondary reflectances thereof.

Referring to FIG. 1 there will be described an inverse vertical seismic profiling system using the drill bit as a seismic source. The drill bit (S) is located within the earth at point A. The geologic horizons within the earth are noted by layers $L_1$, $L_2$ and $L_3$; geologic interfaces $I_0$, $I_1$ and $I_2$; interface depths $Z_0$, $Z_1$ and $Z_2$. Seismic sensor R detects the direct wave produced by the drill bit at Point A travelling along ray path $P_d$, the primary reflected wave travelling along $P_r$, and the secondary wave path travelling along $P_s$. For simplicity, only one secondary reflectance wave path is shown. However, as defined in this application, secondary reflectances include all portions of the original seismic signal which have undergone two or more reflections from geologic horizons prior to being detected by the sensor(s) on the earth's surface. The signal will be increasingly attenuated as it travels through longer distances in the earth or is multiply reflected. Thus, it is likely that the most prominent secondary reflectances detected by the sensor will correspond to a ray path similar to that illustrated. Primary reflectances are defined as those portions of the seismic signal which have undergone only one reflection from a horizon before detection by the sensor.

In the method of this invention, the detection of peaks corresponding to the secondary reflectances is facilitated by an approach similar to Sosie. A seismogram recorded on the earth's surface with, for example, a drill bit as the seismic source, is autocorrelated to yield the autocorrelation function ACF of the transmitted seismogram (referred to hereinafter as an autocorrelogram):

$$ACF\ S(t) = ACF\ W(t) * ACF\ T(t) \tag{3}$$

where
S = observed seismogram,
W = source pulses, and
T = transmission response.
Using a long random series of drill bit vibrations, ACF W(t) is approximately equal to an individual shot pulse I(t). Then, $$ACF\ S(t) = I(t) * ACF\ T(t) \tag{4}$$

The invented method makes use of the Kunetz-Claerbout relationship that states that the reflection seismogram from a surface source and a surface receiver is equivalent to one side of the autocorrelation of the seismogram from a source at depth and the same receiver (the transmitted seismogram of the preceding paragraph) (Claerbout 1968, Geophysics 33:264–269, the contents of which are hereby incorporated by reference). The definition of the Kunetz-Claerbout equation has been extended to include the transmission of horizontally polarized shear (SH) waves (Scherbaum 1987, Bulletin Seis. Soc. Amer. 77:1905–1944, the contents of which are hereby incorporated by reference). However, both the Kunetz-Claerbout and Scherbaum relations require that the source be placed at the bottom of the geologic layering. In the present application the drill bit is placed within the sequence of geologic layers. Therefore, the autocorrelation function contains both transmitted and primary reflectance waves.

The Kunetz-Claerbout equation also assumes that the source is a delta function, that is, an impulse. In the present invention, this may not always be true and the autocorrelogram of the source function may also be produced.

In the method of this invention, the use of the transmission seismogram without prior knowledge of the timing of the onset of source pulses necessitates substantial modification of the Sosie signal processing method. In a preferred embodiment, a one-sided autocorrelation function ACF S(t) is produced from a single recording, as is known in the art:

$$ACF\ S(\tau) = \int_0^T S(t)\ S(t+\tau)dt \tag{5}$$

where
$\tau$ = correlation lag time
T = length of the record
An alternate method for calculation of the autocorrelation function is to perform an inverse Fourier transform of the power spectrum, as is also known in the art.

Since the autocorrelation is a zero phase function, several autocorrelation functions can be stacked to improve the signal-to-noise ratio for the arrival of the direct wave and the primary and secondary reflectance waves, thereby obtaining higher statistical significance in the data. "Stacking" as used herein refers to the process of adding the amplitudes at equivalent time points together for two or more autocorrelation functions aligned at t=0. The stacked autocorrelation function produced thereby is analogous to a power spectral density (PSD) estimate in the frequency domain. The improvement in signal-to-noise level by stacking can be achieved in one of two ways. In the first approach, the autocorrelation data are stacked vertically by adding the corresponding amplitude values from several autocorrelograms, for the same respective lag times. In this case the total record length L is equal to the product of the number of records n times the individual record lengths $$\text{Stacked } ACF\ S(\tau) = \frac{1}{n} \sum_{1}^{n} ACF_n\ S(\tau) \tag{6}$$

Alternatively, the autocorrelation function can be produced from a very long time recording, but having the same lag time as above.

$$\text{pseudo stack } ACF\ S(\tau) = \int_0^L S(t)S(t + \tau)dt \tag{7}$$

An analogous use of autocorrelation functions to enhance otherwise difficult-to-detect signals is described in U.S. Pat. No. 3,812,457 to Weller, the contents of which are hereby incorporated by reference. In Weller, the autocorrelation function produced from a very long time series is utilized to process signals from ambient earth noise.

Figure 2:
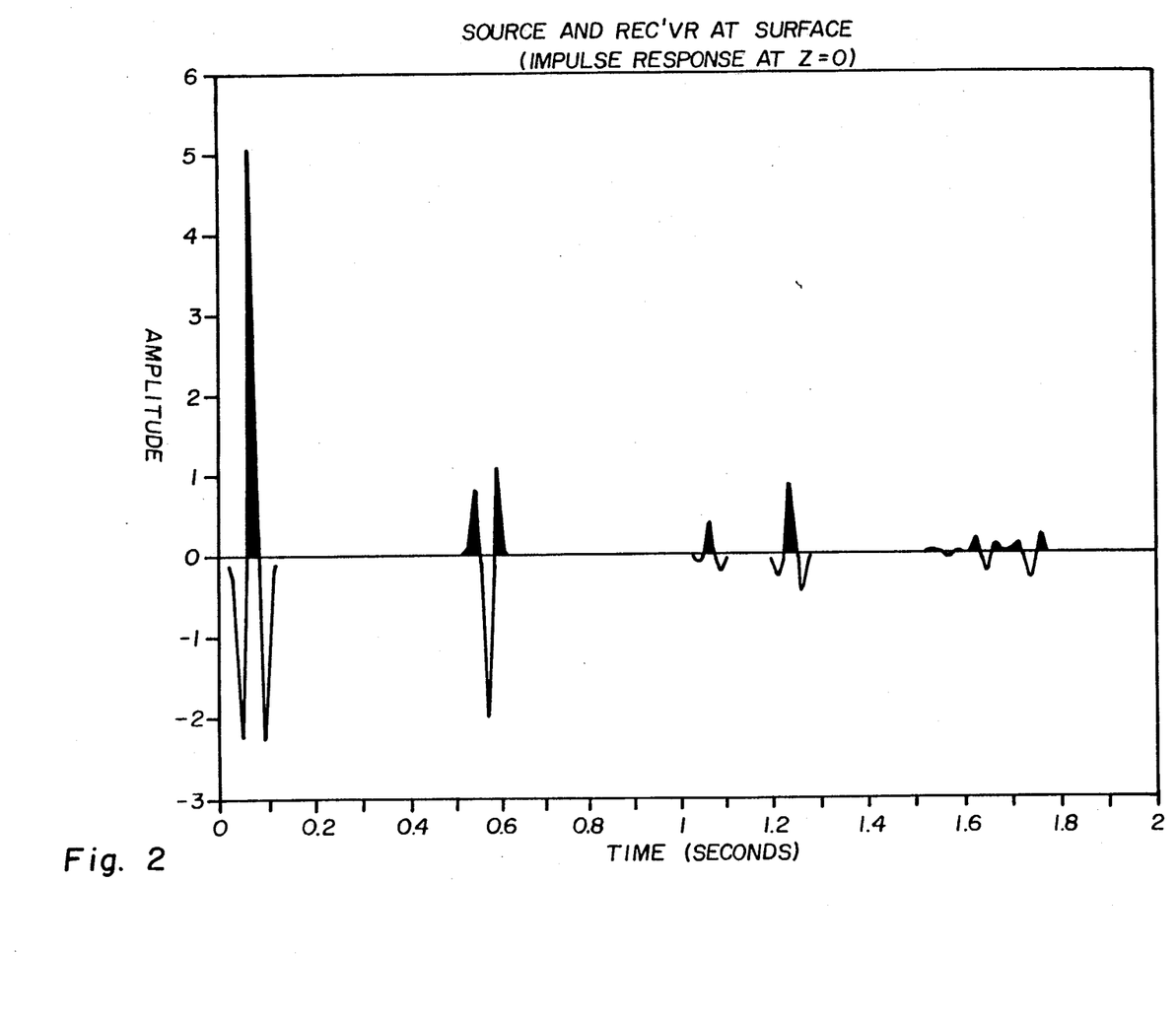
FIG. 2 illustrates the expected wave form for a reflection seismogram corresponding to the geologic sequence of FIG. 1, obtained using a surface source and a surface receiver.
Figure 3:
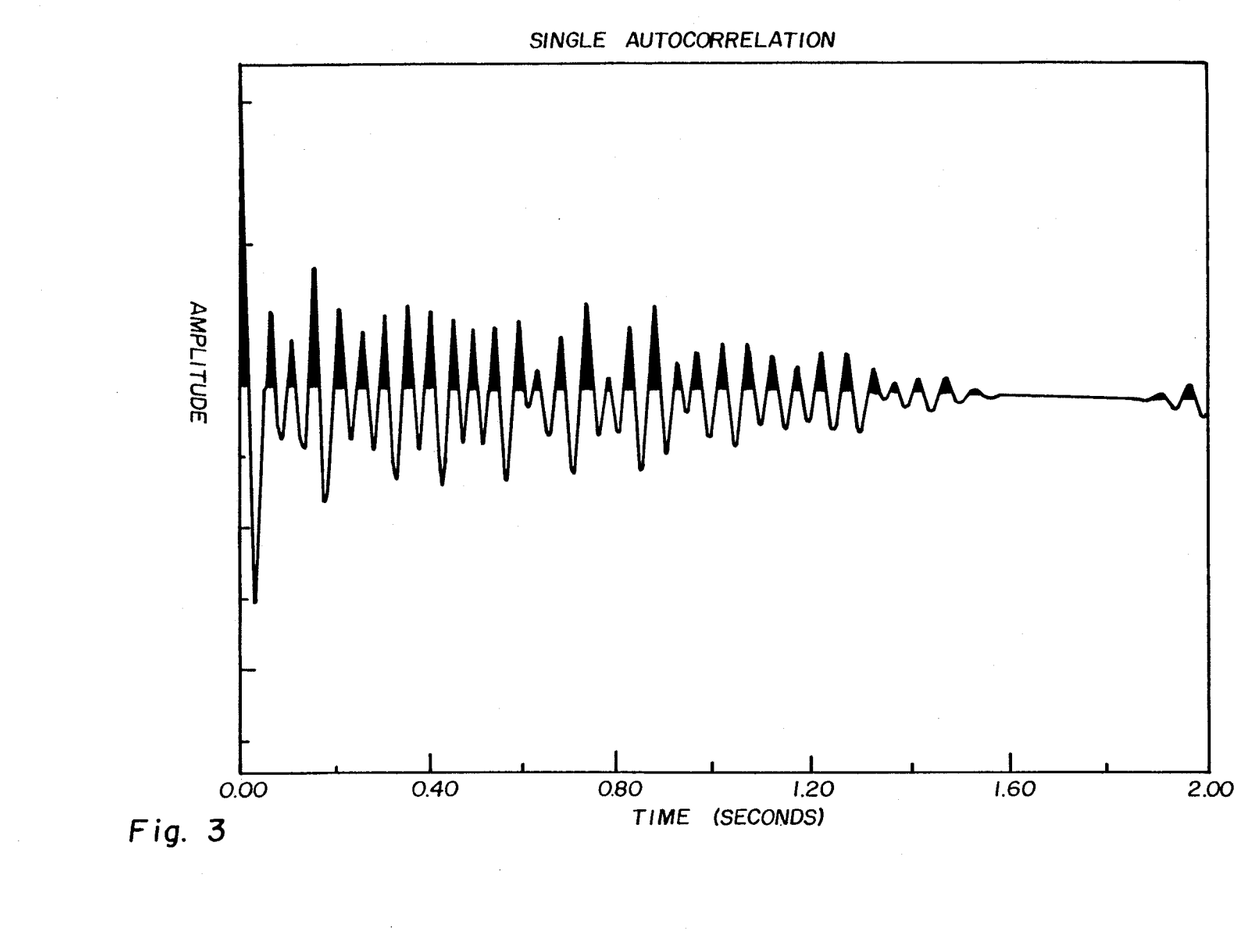
FIG. 3 illustrates a single autocorrelation function produced from waveforms of randomly generated pulses that were produced at Point A and detected by receiver R of FIG. 1.
Figure 4:
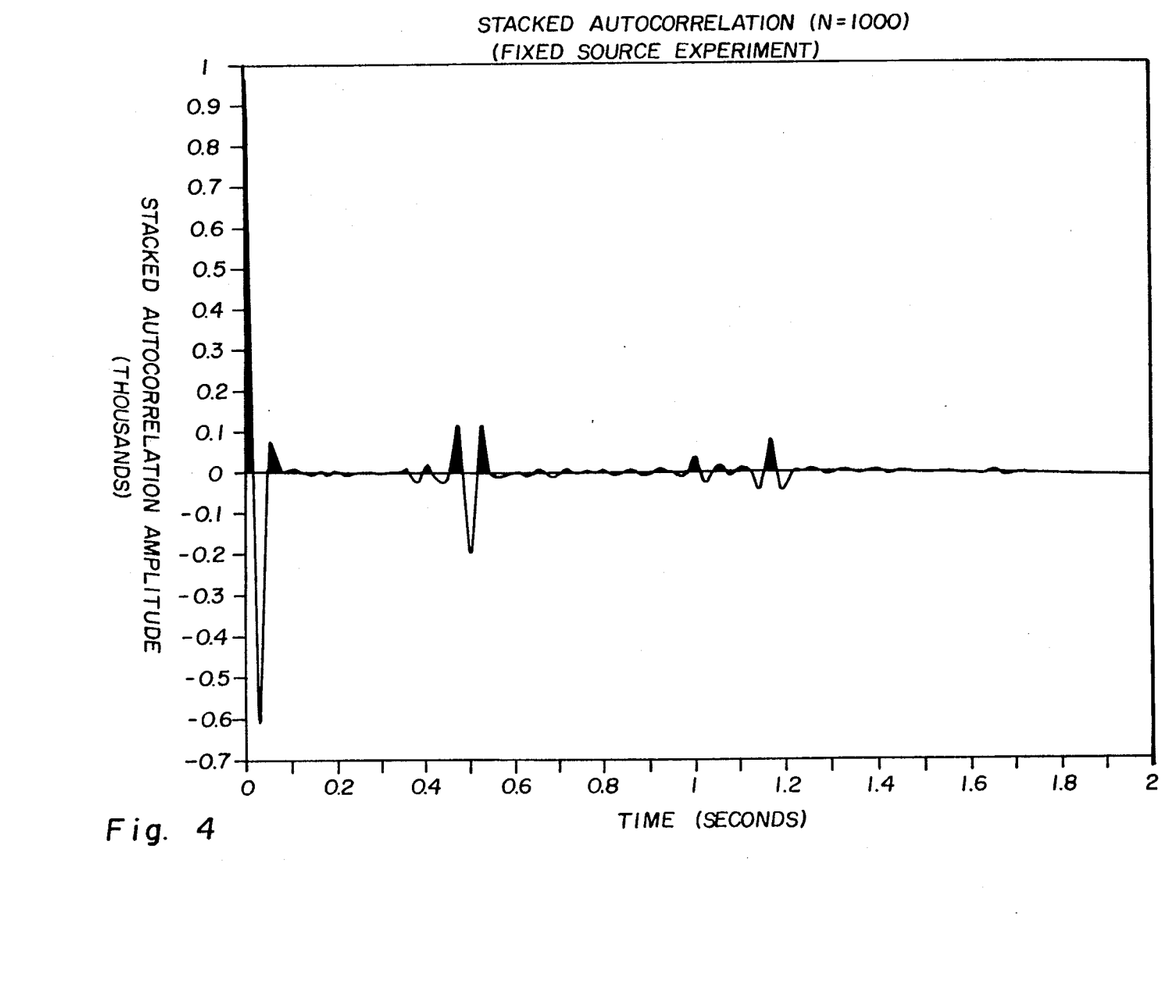
FIG. 4 illustrates the improvement in signal-to-noise obtained by stacking a number of autocorrelation functions.

The one-sided autocorrelation from a single simulated two second record is shown in FIG. 3. This record was produced from a continuous random series of pulses convolved with the earth's reflectivity response for a geologic configuration similar to that shown in FIG. 1. This effectively simulates the expected response of a drill bit source. A drill bit would produce a number of pulses resulting in overlapping seismograms. The autocorrelation tends to align these seismograms at time zero, which is the arrival time of the direct wave pulse. However, depending on the randomness of the source pulses, correlation noise is included in the autocorrelogram. This correlation noise, as well as other random noise occurring on the autocorrelogram, can be reduced by stacking a plurality of records. This is demonstrated in FIG. 4, where after 1000 two second records have been stacked, the autocorrelogram appears to be similar to the reflection seismogram of FIG. 2, which was produced from a source and receiver both located on the earth's surface.

Unlike the method disclosed in Staron, the initiation time of the signal at the drill bit is unknown. The autocorrelated recording reveals the arrival times at the surface of the secondary reflected waves relative to that of the direct wave. It follows that the length of the autocorrelation function has to be at least twice the time equivalent of the depth of investigation. The reflected direct wave needs to penetrate to the deepest reflector of interest and then have time to return to the surface. Since this invention detects relative arrival times and not the absolute arrival times as taught in Staron, transmitted seismic signals can be recorded, autocorrelated processed and stacked continuously from any source position in the borehole. Therefore, in contrast to Staron, resolution in producing a pseudo-reflection seismogram can actually be improved by using longer recording periods and by stacking data obtained from different depths in the borehole.

Figure 5:
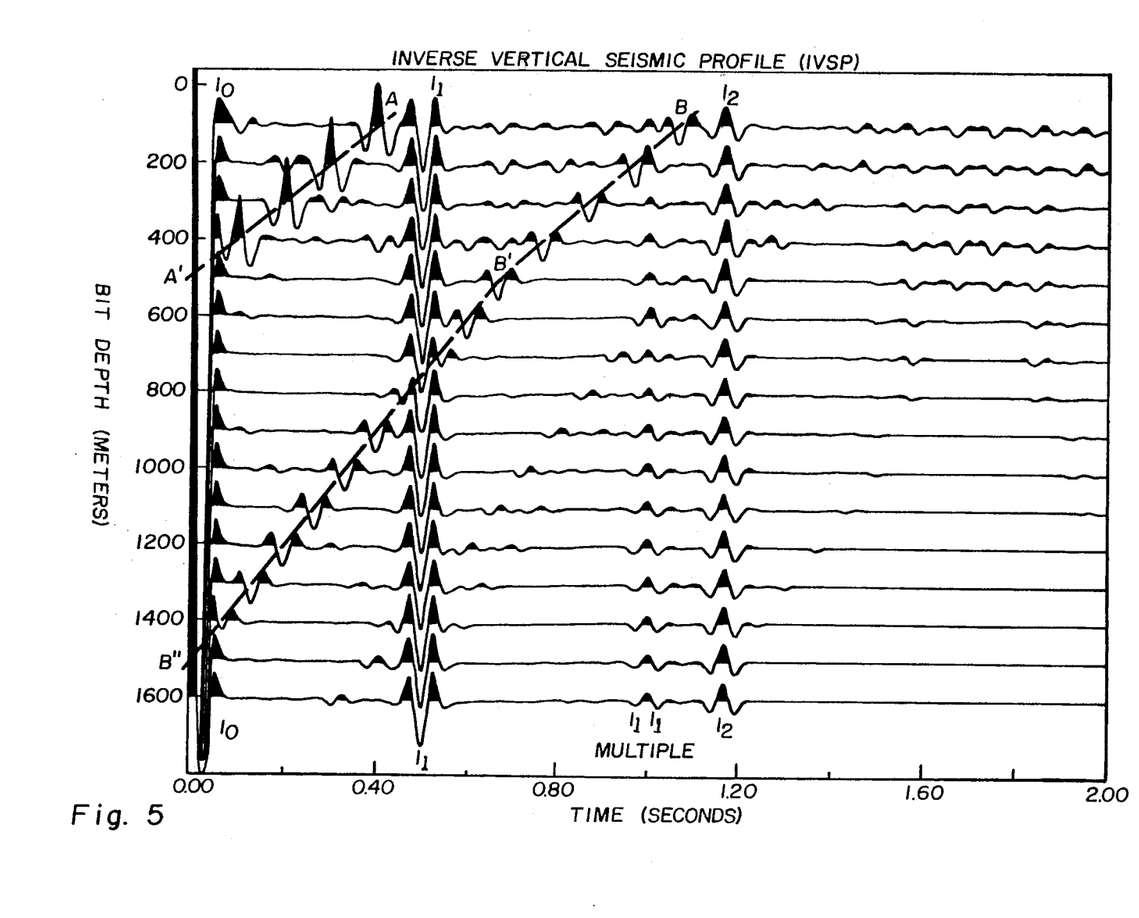
FIG. 5 illustrates an inverse vertical seismic profile comprising autocorrelation functions computed for different source depths in a borehole.

In FIG. 5 are shown a series of stacked autocorrelation functions calculated incrementally at increasing depths in a borehole. The transmitted wave $I_0$ and the secondary reflected waves, which together constitute the pseudo-reflection seismogram corresponding to the interfaces $I_1$ and $I_2$ on FIG. 1, are respectively also labeled $I_0$, $I_1$ and $I_2$ on FIG. 5. The primary reflections from interface $I_1$ are shown connected by the line labeled A—A' on FIG. 5. The primary reflections from interface $I_2$ are similarly identified by the line labeled B—B'—B''. The slope of line segments A—A' and B—B' represents the interval velocity in layer $L_1$. The slope of the line segment B'—B'' represents the interval velocity in layer $L_2$. The interval velocities can be calculated by dividing the distance the source moves in the borehole by the moveout time (relative arrival time) of the primary reflected waves. This is effectively the slope of a time-distance curve. The slope of the appropriate line segment can be measured visually from a plot similar to FIG. 5. Alternatively, the traces may be iteratively shifted for an assumed interval velocity and then cross-correlated to obtain a coherency value. The assumed velocity corresponding to the highest coherency value is the likely interval velocity of the layer. This latter approach is similar to that used to obtain stacking velocities in seismic reflection processing.

A significant advantage of this invention is that the position of the source can be located relative to the inverse vertical seismic profile. As shown in FIG. 5, each primary reflectance appearing on the IVSP starts at the corresponding secondary reflectance for the same geologic horizon, and ends at time zero when the bit exists is positioned at that horizon. When the source is located at the lower boundary of a geologic stratum, the primary reflected waves (i.e., A—A' or B'—B'') will be superimposed on the direct wave, or in other words will intercept time zero. Thus, if the source is a drill bit, it is possible to know when the bit is about to penetrate into the next stratum. In FIG. 1, the lower boundary $I_1$ of Layer L1, occurs at a depth $Z_1 = 500$ m. This corresponds to the point A' on FIG. 6. The relative position of the drill bit and the IVSP can be obtained simultaneously.

Furthermore, the IVSP corresponding to the entire penetration depth of the well can likely be produced after drilling the first several hundred feet of the well.

Figure 6:
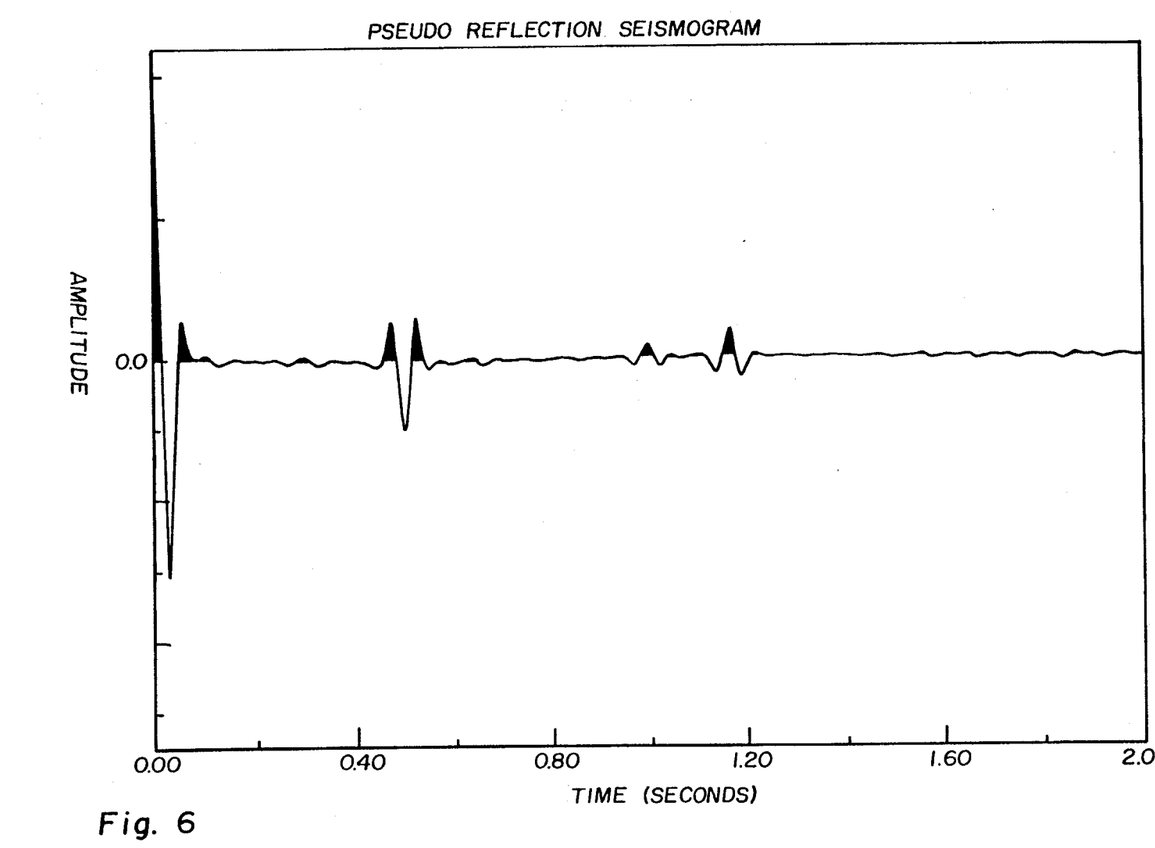
FIG. 6 illustrates the pseudo-reflection seismogram comprising the direct wave arrival and that of the secondary reflectance waves, which was obtained by vertically stacking the autocorrelation functions of FIG. 5.

In the preferred embodiment, the primary reflectance waves occurring in the autocorrelation function are removed by vertically stacking the individual autocorrelations calculated for different depths in the borehole. Vertical stacking may also remove periodic reverberation produced from the drill pipe. The period of those waves becomes larger with increases in the length of drill pipe downhole. The individual autocorrelation functions shown in FIG. 5 were vertically stacked to produce the pseudo-reflection seismogram shown in FIG. 6. As can be seen, the pseudo-reflection seismogram of FIG. 6 is similar to the reflection seismogram of FIG. 2.

An alternate method for removing the primary reflectance waves is by velocity or dip filtering the autocorrelation functions produced by recordings made at various depth increments (i.e., FIG. 5). It may be more advantageous, especially where extraneous periodic signals occur in the data, to work with the primary reflected waves. In that case the secondary reflections can be removed by dip or velocity filtering to leave the primary reflectances. The moveout time of the primary reflected waves on the autocorrelogram can then be used to discriminate against periodic signals with zero moveout times.

In a highly preferred embodiment, it is desirable to remove extraneous periodic signals from the data before proceeding with the signal processing described hereinabove. This is especially true when the data is being acquired in the presence of an operating drill rig. Resonance in the drill pipe and bottomhole assembly, the mud pumps, and the engines can produce periodic signals. A method useful for this purpose is disclosed in U.S. Pat. No. 4,460,059 to Katz, the contents of which are hereby incorporated by reference. Katz teaches therein a method of selectively focusing an array of geophones on the approximate position of the drill bit to segregate the drilling signal from other signals. Other means for removing these periodic signals include: notch frequency filters, polarization filters, using geophone arrays that suppress horizontally traveling signals, and deconvolution with a pilot signal obtained from placing a seismic sensor on the drilling platform or from attaching a seismic sensor to the drill pipe. Other means for reducing the effects of the periodic signal include a spectral whitening process, and stacking data traces with offset or with depth. These and a number of other signal processing techniques are available to remove noise from the data, as is well known in the art.

In some applications it may be desirable to remove source effects from the data. This would be especially true if the source possessed periodic components. A seismic sensor can be attached to the drill rig or to the drill pipe to record the source signal in simultaneity with the recording of the transmitted and reflected waves on the surface sensors. Homo-morphic deconvolution can then be used on the autocorrelation function to remove the source effects.

As is known in the art, performing homomorphic deconvolution involves transforming the autocorrelation ACF S(t) to the frequency domain using a Fourier transform. The Fourier transform of the autocorrelation function is the power spectrum P. Convolution in the time domain is equal to multiplication in the frequency domain. Thus, $$P_s(f) = P_w(f) \cdot P_T(f), \tag{8}$$

where $p_s$ = the power spectrum of the seismogram, $P_w$ = the power spectrum of the source, and $P_T$ = the power spectrum of the earth's transmissivity. Taking the natural log of the power spectrum separates the source and transmissivity functions into a summation:

$$Ln\ P_s(f) = Ln\ P_w(f) + Ln\ P_T(f) \qquad (9)$$

An inverse Fourier transform then produces the autocepstrum $\overline{ACF}$ in the quefrequency (q) domain.

$$\overline{ACF}\ S(q) = \overline{ACF}\ W(q) + \overline{ACF}\ T(q) \qquad (10)$$

The signal can now be filtered (i.e., High Pass Lifter, Low Pass Lifter, Comb Filter) to remove the source effects. The filter operator can be designed by using the known length of drill pipe downhole, the length of the bottom hole assembly, the drill bit rotation rate, or by measuring the vibrations at the top of the drill pipe. After source effects are filtered from the autocepstrum the results are Fourier transformed back to the frequency domain. The exponential e is then calculated to produce the Power Spectrum. Finally, the inverse Fourier transform is used to obtain the deconvolved autocorrelation.

An alternate method of removing noise from the data is to subtract the Fourier amplitude spectrum or power spectrum recorded during tripping from the spectra recorded during drilling. "Tripping" is herein defined as pulling the bit out of the borehole. A preferred embodiment of this method is to produce the autocepstrum (as described herein supra) of a spectrum recorded during tripping and subtract that from the autocepstrum of the drilling spectra.

In a highly preferred embodiment, it is desirable to process the data on-site since the amount of data to be acquired in monitoring a drilling operation, typically for 30 days or longer, can become overwhelming. On-site processing also provides the driller or well site geologist with immediate information. Computing means such as personal computers can readily perform the autocorrelation and stacking computations. There are electronic chips known in the art which in themselves can calculate autocorrelation functions. When the autocorrelation function is calculated on site, only the individual autocorrelation functions or increments of stacked autocorrelation functions need to be saved. This requires less data storage than storing the entire original time record.

In an alternate embodiment, the data may be saved in the form of Fourier amplitude spectra. Such amplitude spectra can later be processed by squaring the amplitude spectrum and then performing an inverse Fourier transform to produce the autocorrelation function. Or, the Fourier amplitude spectrum itself can be squared and stacked to yield the power spectral density function, which can then be converted to the stacked autocorrelation function. All of these manipulations are known in the art.

Storing the Fourier spectrum or power spectrum as described above has the advantage of requiring less storage space. This because data compression techniques can be applied to such spectra. Since the spectral points or lines are likely to exceed the frequencies of interest, these excess frequency components can be set to zero. This is effectively a low pass filter. These higher frequency zero amplitude values do not need to be stored. Only the lower frequency spectral amplitude values need to be saved. For example, perhaps only the first half of the amplitude spectrum needs to be saved. Upon playback, the second half of the amplitude spectrum can be padded with zero amplitude values, and an inverse Fourier transform performed on the squared amplitude spectrum to produce the autocorrelation function.

Returning to FIG. 1, seismic sensor R may include one or more seismic detection components, as well as means to perform signal conditioning (i.e., amplification and filtering), signal processing (i.e., autocorrelation or Fourier transform), recording, and display components. Any suitable recording medium may be used, including magnetic tape.

One sensor is sufficient to construct an IVSP. However, any number of sensors can be placed on the ground in different locations. It is desirable in some cases to bury the sensor(s) in order to reduce noise from surface sources in the recording. Adequate noise reduction can generally be achieved with reasonable convenience at sensor depths of up to about 100 feet. It is also possible, though not necessary, to place a sensor on the drill rig or attach it to the drill pipe to record noise from the drilling operation.

The seismic sensor may comprise an array of individual components, which can either be arranged to record separately, or wired together. When wired together, a single recording will result in which any surface waves produced by the drilling or other surface sources are substantially cancelled out. When the components record separately, the individual recordings may be later processed by summing or velocity filtering to accomplish the same purpose.

Sensors may consist either of vertical motion sensitive components, horizontal motion sensitive components, or a combination thereof. Recordings from the vertical motion component(s) may be used to compile a P-wave IVSP, whereas recordings from the horizontal motion component(s) may provide an S-wave IVSP. In some cases the seismic source or radiation patterns would favor analyzing one wave type over the other. If a vertical motion component is used, it is preferable to place it within a 20 degree angle of incidence relative to the position of the downhole source to reduce the contribution of converted vertically polarized S waves to the recorded signal. A highly preferred sensor unit comprises one vertical motion sensitive component and two horizontal motion sensitive components, with the horizontal motion components being disposed radial and transverse to the source position.

The drill bit signal can be enhanced in strength by increasing the weight on the bit. Or, a more random sequence of drill bit pulses may be obtained by reducing the weight on the bit and/or varying its rotation rate.

Although the invention has been described largely with reference to a random series of continuous pulses such as from a drill bit, the transmitted seismic pulse may also be produced by multiple or single impulsive or vibratory sources. Multiple seismic sources can be positioned at different depths in a borehole. All of the sources would then be activated or detonated simultaneously. The simultaneous firing of the sources would produce at the surface a set of randomly arriving impulses. This would be caused by the differences in seismic arrival times produced by placing the sources at different depths in the borehole. The autocorrelation function would coherently stack the secondary reflectances produced by the transmitted seismograms. The waves corresponding to the primary reflectances on the autocorrelation function would be out of phase, and thus, would be attenuated in amplitude. This approach of using multiple sources permits the total energy of the source to be spread out over a larger area, thus avoiding possible damage to the borehole.

The invention is furthermore applicable to any other type of downhole source that produces a seismic signal during drilling or one that is lowered down a borehole after drilling has been completed, including impulsive sources.

It is further understood that the invention is not to be limited to the specific embodiments set forth herein by way of exemplifying the invention. Rather, the invention is to be limited only by the scope of the attached claim or claims, including the full range of equivalency to which each element or step thereof is entitled.

I claim:

1. A method for compiling an inverse vertical seismic profile by detection of direct waves and secondary reflectances of a seismic signal produced by a seismic source located within a series of geologic strata in a borehole, said method comprising:

a first step of placing one or more seismic sensors in contact with the earth and within sensing distance of a downhole seismic source;

a second step of making at least one recording of seismic signals generated by said downhole seismic source located at a first depth position and transmitted through the earth to said seismic sensors, said recording including direct waves and primary and secondary reflectances thereof;

a third step of calculating at least one one-sided autocorrelation function comprising peaks corresponding to the arrival times at said sensor of said direct waves, primary reflectances and secondary reflectances from said recording;

a fourth step of repeating said second and third steps for a plurality of depth positions of said downhole seismic source to produce a plurality of autocorrelation functions each corresponding to a different depth position to produce an inverse vertical seismic profile wherein said secondary reflectance peaks correspond to relative positions of interfaces between different geologic layers.

2. The method of claim 1, further including a fifth step of stacking said plurality of autocorrelation functions to remove said peaks corresponding to the arrival times of said primary reflectances and to produce a pseudo-reflection seismogram.

3. The method of claim 1, further including a step of estimating an interval velocity for at least one stratum within said series from a subset of said plurality of autocorrelation functions of said fourth step, said subset comprising the autocorrelation functions produced from recordings made while said seismic source is positioned within said stratum.

4. The method of claim 3, wherein said step of estimating an interval velocity comprises:

making a plot of curves each representing one member of said subset of autocorrelation functions, said curves being in a vertical arrangement wherein said curves are separated from each other by equal vertical distances, said curves further being arranged in a monotonic sequence from the curve corresponding to the shallowest depth position of said seismic source to the curve corresponding to the deepest depth position of said seismic source, and said curves being aligned to have their respective direct wave peaks positioned above one another in a vertical direction;

constructing a line passing through said peaks corresponding to said primary reflectances;

graphically estimating the slope of said line.

5. The method of claim 3, wherein said step of estimating an interval velocity comprises:

subjecting said autocorrelation functions of said subset to means for iteratively shifting said autocorrelation functions for a plurality of assumed interval velocities to produce shifted autocorrelation curves;

subjecting each of said shifted curves to cross-correlation means to obtain a group of coherency values each corresponding to an individual value from said plurality of assumed interval velocities;

estimating said interval velocity as equal to the individual value corresponding to the highest coherency value of said group.

6. The method of claim 1 wherein at least some of said seismic sensors include vertical motion sensitive components producing a compressional wave inverse vertical seismic profile.

7. The method of claim 1 wherein at least some of said seismic sensors include horizontal motion sensitive components producing a shear wave inverse vertical seismic profile.

8. The method of claim 1 further including a step of determining the position of said seismic source within a stratum relative to the lower boundary of said stratum from the relative distance between the peak corresponding to the primary reflectance from said lower boundary and the zero time axis of said one-sided autocorrelation function, wherein when said seismic source is positioned at said lower boundary, said peak corresponding to said primary reflectance is superimposed on said zero time axis, said seismic source is positioned at said lower boundary.

9. The method of claim 8 in which said position of said seismic source is determined relative to said inverse vertical seismic profile, and wherein said seismic source position and said inverse vertical seismic profile are calculated at nearly the same time.

10. The method of claim 1 in which said autocorrelation functions autocorrelation functions are produced in approximately real time at or near the well site.

11. The method of claim 1 wherein said recordings are subjected to computing means to produce Fourier amplitude or stacked power spectra.

12. The method of claim 11 wherein said source is a drill bit and further including the steps of making a noise recording during removal of said drill bit from the hole, converting said noise recording to a Fourier amplitude or power noise spectrum, and subtracting said noise spectrum from said Fourier amplitude or power spectra of said recordings made during drilling to remove noise from said spectra recorded during drilling.

13. The method of claim 1 wherein said recordings are subjected to computing means to produce stacked Fourier amplitude or stacked power spectra.

14. The method of claim 1, where said second step comprises making a plurality of recordings at said first depth position, said third step further includes calculating an autocorrelation function from each of multiple individual said first depth recordings and stacking said first depth multiple autocorrelation functions to reduce correlation noise and other signal noise and to produce a single stacked first depth autocorrelation function comprising peaks corresponding to the arrival times at said sensor of said direct waves, primary reflectances and secondary reflectances, and said fourth step produces a plurality of stacked autocorrelation functions.

15. The method of claim 14, further including a fifth step of stacking said plurality of stacked autocorrelation functions to remove said peaks corresponding to the arrival times of said primary reflectances and to produce a pseudo reflection seismogram.

16. The method of claim 14, further including a step of estimating an interval velocity for at least one stratum within said series from a subset of said plurality of stacked autocorrelation functions of said fourth step, said subset comprising the stacked autocorrelation functions produced from recordings made while said seismic source is positioned within said stratum.

17. The method of claim 16, wherein said step of estimating an interval velocity comprises:
    making a plot of curves each representing one member of said subset of stacked autocorrelation functions, said curves being in a vertical arrangement wherein said curves are separated from each other by equal vertical distances, said curves further being arranged in a monotonic sequence from the curve corresponding to the shallowest depth position of said seismic source to the curve corresponding to the deepest depth position of said seismic source, and said curves being aligned to have their respective direct wave peaks positioned above one another in a vertical direction;
    constructing a line passing through said peaks corresponding to said primary reflectances;
    graphically estimating the slope of said line.

18. The method of claim 16, wherein said step of estimating an interval velocity comprises:
    subjecting said stacked autocorrelation functions of said subset to means for iteratively shifting said stacked autocorrelation functions for a plurality of assumed interval velocities to produce shifted autocorrelation curves;
    subjecting each of said shifted curves to cross-correlation means to obtain a group of coherency values each corresponding to an individual value from said plurality of assumed interval velocities;
    estimating said interval velocity as equal to the individual value corresponding to the highest coherency value of said group.

19. The method of claim 14 wherein at least some of said seismic sensors include vertical motion sensitive components producing a compressional wave inverse vertical seismic profile.

20. The method of claim 14 wherein at least some of said seismic sensors include horizontal motion sensitive components producing a shear wave inverse vertical seismic profile.

21. The method of claim 14 further including a step of determining the position of said seismic source within a stratum relative to the lower boundary of said stratum from the relative distance between the peak corresponding to the primary reflectance from said lower boundary and the zero time axis of said stacked autocorrelation function, wherein when said seismic source is positioned at said lower boundary, said peak corresponding to said primary reflectance is superimposed on said zero time axis, said seismic source is positioned at said lower boundary.

22. The method of claim 21 in which said position of said seismic source is determined relative to said inverse vertical seismic profile, and wherein said seismic source position and said inverse vertical seismic profile are calculated at nearly the same time.

23. The method of claim 14 wherein said recordings are subjected to computing means to produce Fourier amplitude or power spectra.

24. The method of claim 14 wherein said recordings are subjected to computing means to produce stacked Fourier amplitude or stacked power spectra.

25. The method of claim 14 wherein said source is a drill bit and further including the steps of making a noise recording during removal of said drill bit from the hole, converting said noise recording to a Fourier amplitude or power noise spectrum, and subtracting said noise spectrum from the Fourier amplitude or power spectra recorded during drilling to remove noise from said spectra recorded during drilling.

26. A system for compiling inverse vertical seismic profiles and pseudo reflection seismograms utilizing the transmitted pulses and the secondary reflectances of a seismic signal produced by a seismic source within a borehole, comprising:
    a downhole seismic source position able at a first depth position;
    means for adjusting the depth position of said downhole seismic source in said borehole to a plurality of depth positions differing from said first depth position;
    a seismic sensor positionable transversely away from said borehole and within sensing distance from said downhole seismic source;
    recording means for recording data comprising direct waves, primary reflectances and secondary reflectances of seismic signals produced by said downhole seismic source;
    autocorrelating means for autocorrelating recordings made by said recording means while said seismic source is at a particular depth position and producing a plurality of autocorrelation functions corresponding to different depth positions;
    computing means for stacking said autocorrelation functions produced by said autocorrelating means to produce stacked autocorrelation functions at each of said different depth positions to produce an inverse vertical seismic profile and for stacking a plurality of said stacked autocorrelation functions corresponding to said different depth positions to produce a pseudo reflection seismogram; wherein said autocorrelating means and said computing means are positionable at the site of said borehole and produce said autocorrelation functions, stacked autocorrelation functions, and inverse vertical seismic profile in approximately real time.

* * * * *